(12) United States Patent
Hsu et al.

(10) Patent No.: US 6,339,490 B1
(45) Date of Patent: Jan. 15, 2002

(54) OPTICAL SCANNING APPARATUS

(75) Inventors: Juei-Tsang Hsu, Miaoli; Chun-Jung Chen, Yunlin Hsien, both of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/731,740

(22) Filed: Dec. 8, 2000

(30) Foreign Application Priority Data

Sep. 20, 2000 (TW) .......................................... 89119331

(51) Int. Cl.[7] .............................................. G02B 26/08
(52) U.S. Cl. ......................... 359/210; 359/205; 359/206
(58) Field of Search .............................. 359/205–206, 359/662, 210

(56) References Cited

U.S. PATENT DOCUMENTS

| 4,930,850 A | 6/1990 | Morimoto |
| 4,934,772 A | 6/1990 | Sakuma et al. |
| 6,239,895 B1 * | 5/2001 | Keeney ...................... 359/210 |

* cited by examiner

*Primary Examiner*—James Phan
(74) *Attorney, Agent, or Firm*—Birch, Stewart, Kolasch & Birch, LLP

(57) ABSTRACT

An optical scanning apparatus having at least one f-θ lens positioned on a rotary device. A collimated light beam is refracted to produce a linear scan by the rotation of the f-θ lens by the rotary device. By not using a rotary polygonal mirror, the optical scanning apparatus has the advantages of better tolerance, less optical parts, easy assembly, low production cost and compact structure.

12 Claims, 8 Drawing Sheets

OPTICAL SCANNING APPARATUS

BACKGROUND OF THE INVENTION

1. Field of the Invention

The invention relates to an optical scanning apparatus. In particular, the invention relates to an optical scanning apparatus, which utilizes a rotary polygonal f-θ lens for deflecting a light beam upon, for example, a scanned object or recording media.

2. Description of the Related Art

FIG. 1 is a drawing for illustrating an optical scanning system of the related art. As shown in FIG. 1, the optical scanning system generally consists of: a semiconductor light source 1, a collimator lens 2, a cylindrical lens 3, a rotary polygonal mirror 4 and an f-θ lens (or toroidal lens) 5. The semiconductor light source 1 emits a light beam, and the light beam is transformed into a collimated light beam by the collimator lens 2. Next, the cylindrical lens 3 adjusts the shape and the focus position of the collimated light beam, and then the light beam impinges upon the rotary polygonal mirror 4. Next, the rotary polygonal mirror 4 with a constant angular velocity deflects the light beam upon the f-θ lens 5, and then the f-θ lens 5 focuses the light beam onto a mirror 6 to form a linear scan. Finally, the mirror 6 reflects the scanning light beam onto the object 7 at linear constant speed. The aspheric surface of an f-θ lens can be designed by referring to U.S. Pat. No. 4,930,850 or U.S. Pat. No. 4,934,772 . . . etc.

In the related art, a rotary polygonal mirror reflects the incoming light beam to generate a scanning light beam, that is to say, a swimming light source. Although the polygonal mirror rotates at a constant angular velocity, the light beam reflected from it impinges on the scanned object at a varied speed. Therefore, the f-θ lens alters the light beam reflected from the rotary polygonal mirror to impinge on the scanned object at a constant speed.

However, if a semiconductor light source is misalignment and emits a light beam with an angle error $\phi$, there will introduce an angle error to $2\phi$ after the light beam is incident on a rotary polygonal mirror. Moreover, if a rotary polygonal mirror tilts an angle error $\phi'$, it will also introduce an angle error to $2\phi'$ after the light beam is reflected. Therefore, the rotary polygonal mirror of the related art has the property of increasing angle error, and further decreases the machining accuracy. Furthermore, the scanning light beam, which is reflected by the rotary polygonal mirror, causes a shift amount. Moreover, the defect of the rotary polygonal mirror causes increases the manufacturing time because aligning of the rotary polygonal mirror and f-θ lens takes longer.

SUMMARY OF THE INVENTION

An object of this invention is to provide an optical scanning apparatus, which comprises a semiconductor light source, a collimator lens, a cylindrical lens, and a rotary f-θ lens. The rotary f-θ lens alters the propagating direction of the light beam to scan linearly at a constant speed.

A feature of the invention is the inclusion of an f-θ lens rotating at a constant angular velocity. The rotary f-θ lens refracts the light beam to form a linear scan. Therefore, it doesn't increase the angle error.

By not using a rotary polygonal mirror in the optical scanning apparatus, the number of optical components is reduced. Thereby, the present invention achieves the advantages of easy assembly, low production cost, and compact structure.

BRIEF DESCRIPTION OF THE DRAWINGS

This and other objects and features of the invention will become clear from the following description, taken in conjunction with the preferred embodiments with reference to the drawings, in which.

DETAILED DESCRIPTION OF THE PREFERRED EMBODIMENT

First Embodiment

Figure 1:
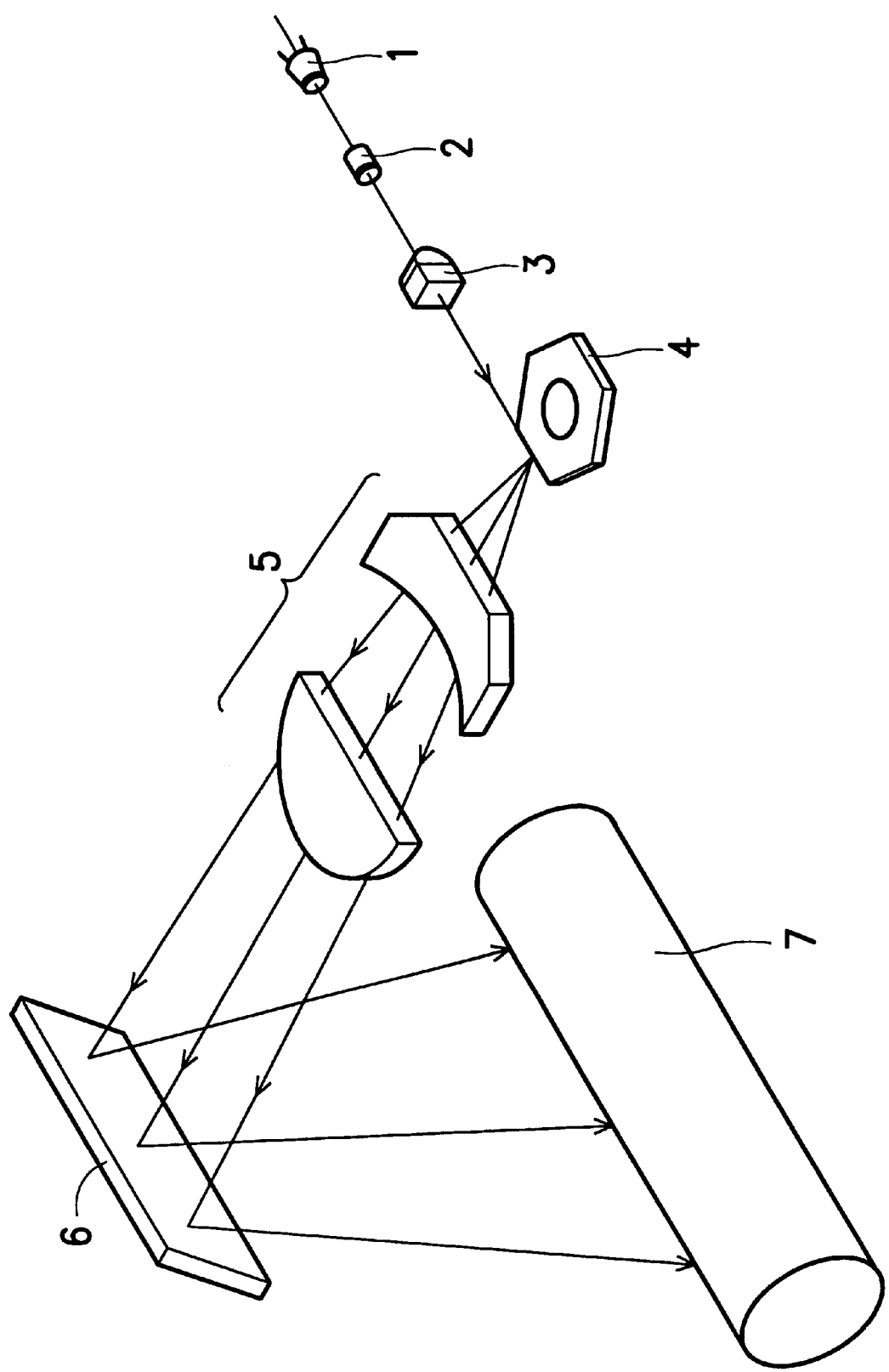
FIG. 1 is a drawing for illustrating an optical scanning system of the related art.
Figure 2A:
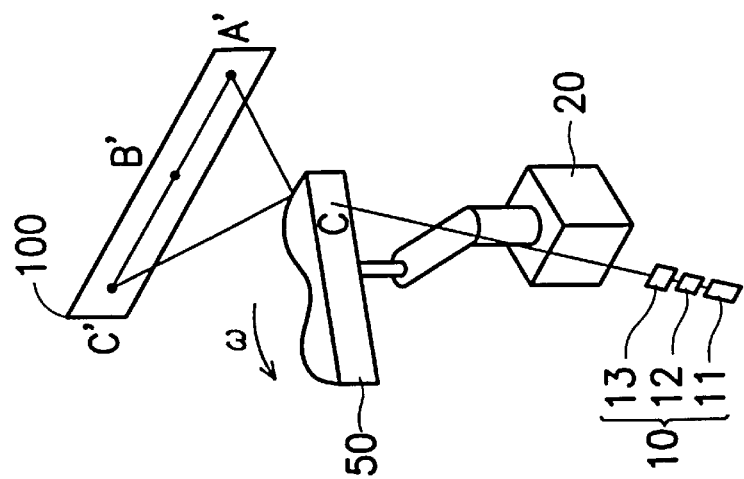
FIGS. 2A to 2C are perspective top views illustrating the operation of the first embodiment of the invention.
Figure 2B:
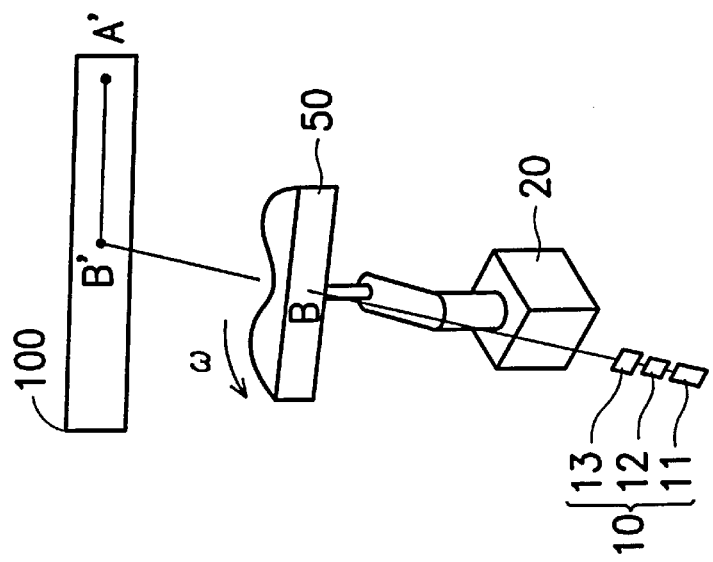
Figure 2C:
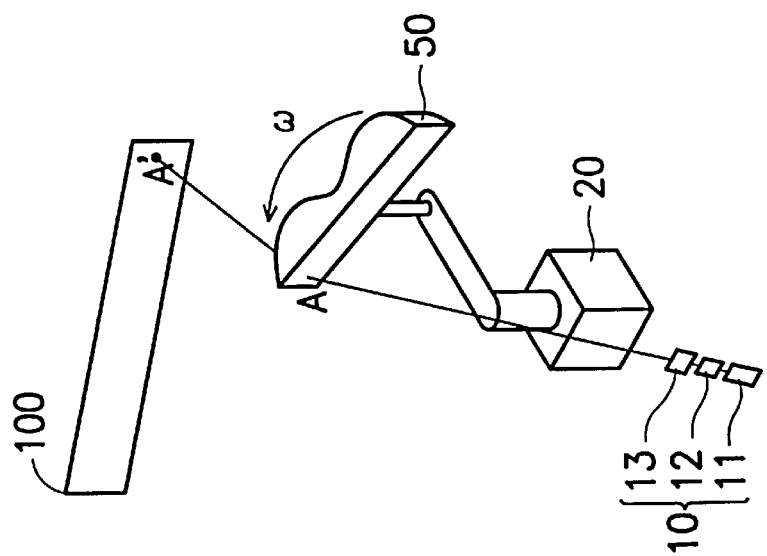

Referring to FIGS. 2A to 2C, the optical scanning apparatus of the present invention comprises an f-θ lens 50, a rotating device 20 and a light source 10 emitting a collimated light beam producing a linear scan at a constant speed. The light source 10 can be a semiconductor laser, a light-emitting diode, or any of other light sources. The collimated light beam is emitted from a laser 11, and then a collimator lens 12 and a cylindrical lens 13 adjust the spot size and shape of the light to propagate toward a predetermined direction. The f-θ lens 50 is made of glass or plastic material, and the material can be molded into a predetermined shape. The f-θ lens 50 is integrated with a rotating device 20, and, therefore, the rotating device 20 can drive the f-θ lens 50 to rotate at a constant angular speed $\phi$. For keeping the rotation balance during high speed, user can position appropriate weight on the opposite side of the f-θ lens 50.

As shown in FIG. 2A, the collimated light beam is incident on a position A of the f-θ lens 50 rotating at a constant angular speed $\phi$. The f-θ lens 50 refracts the light beam to impinge on a position A' of a scanned object 100. Next, as the f-θ lens 50 proceeds to rotate to the position shown in FIG. 2B, the collimated light beam is incident on a position B of the f-θ lens 50. The f-θ lens 50 refracts the light beam to impinge on a position B' of a scanned object 100. Next, as the f-θ lens 50 proceeds to rotate to the position shown in FIG. 2C, the collimated light beam is incident on a position C of the f-θ lens 50. The f-θ lens 50 refracts the light beam to impinge on a position C' of the scanned object 100.

Furthermore, the rotating device 20 can drive the f-θ lens 50 to rotate in sequence, the light beam based on the sequencing of A' to B' to C' results in linear scan at a constant speed. In another way, the rotating device 20 also can reverse the rotation of the f-θ lens 50. The optical scanning apparatus bases on the sequencing of C' to B' to A' to produce a linear scan at a constant speed. Therefore, the optical scanning apparatus produces a linear scan with a period of A' to B' to C' to A' to B' to C' at a constant speed.

Second Embodiment

Figure 3:
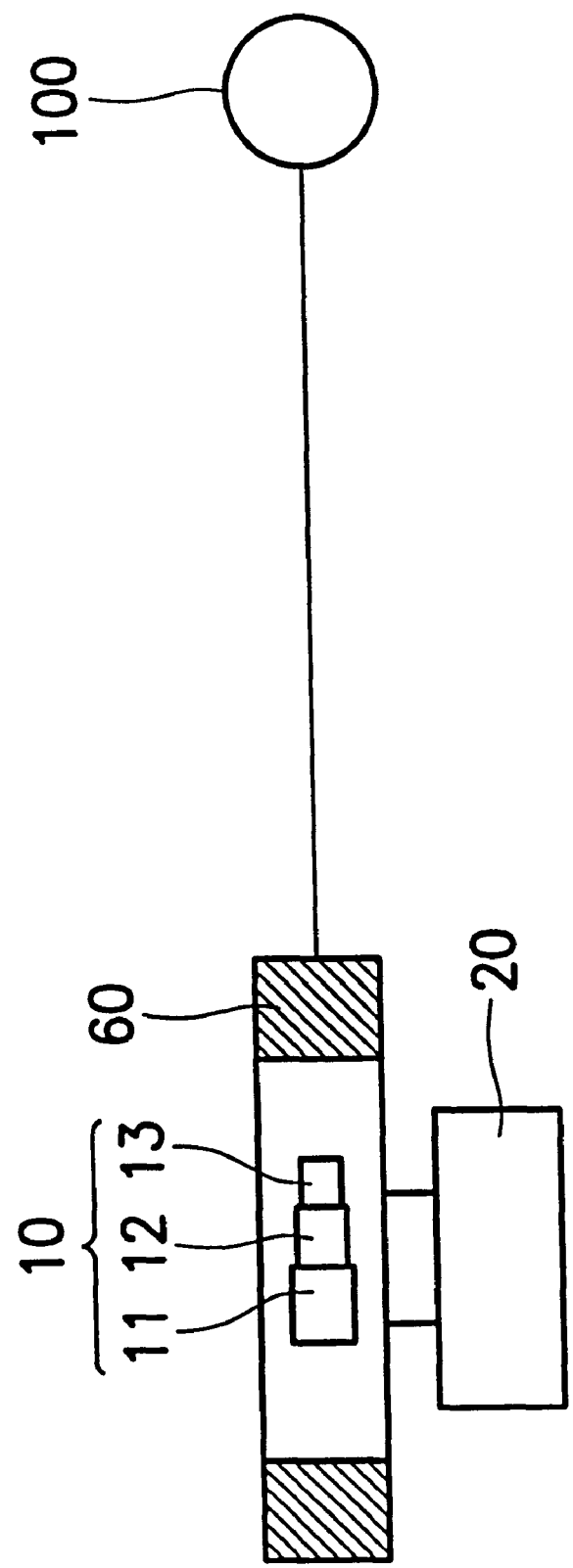
FIG. 3 is a perspective side view of an optical scanning apparatus of the second embodiment of the invention.

FIG. 3 is a perspective side view of an optical scanning apparatus of the second embodiment of the invention. An optical scanning apparatus of the second embodiment comprises a polygonal f-θ lens 60, a rotating device 20 and a light source 10 emitting a collimated light beam producing a linear scan at a constant speed. The light source 10 can be a semiconductor laser, a light-emitting diode, or any of other light sources. The collimated light beam is emitted from a laser 11, and then a collimator lens 12 and a cylindrical lens 13 adjust the spot size and shape of the light beam to propagate toward a predetermined direction. The polygonal f-θ lens 60 comprises a plurality of f-θ lenses forming the shape of a polygon. The plurality of f-θ lenses can be disposed in a discrete manner or combined with each to form a single lens. Each f-θ lens is made of glass or plastic material, and the material can be molded into a predetermined shape. The polygonal f-θ lens 60 is integrated with a rotating device 20, and, therefore, the rotating device 20 can drive the polygonal f-θ lens 50 to rotate at a constant angular speed φ.

Figure 4A:
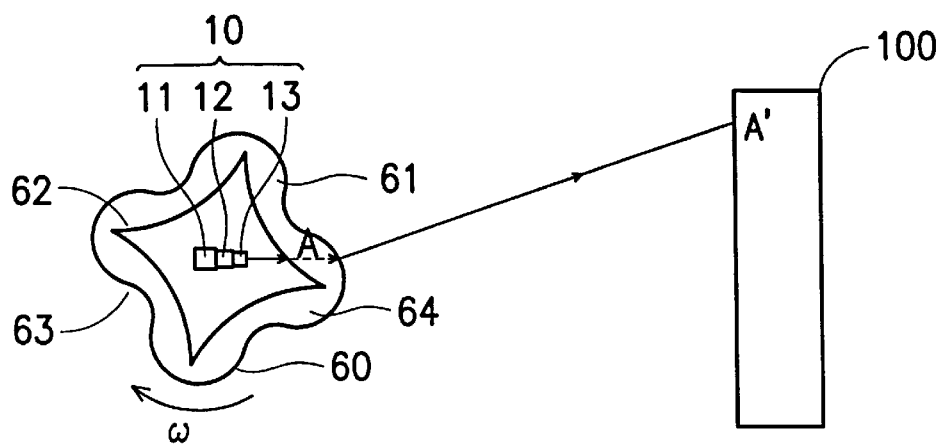
FIGS. 4A to 4C are perspective top views illustrating the operation of the second embodiment of the invention.
Figure 4B:
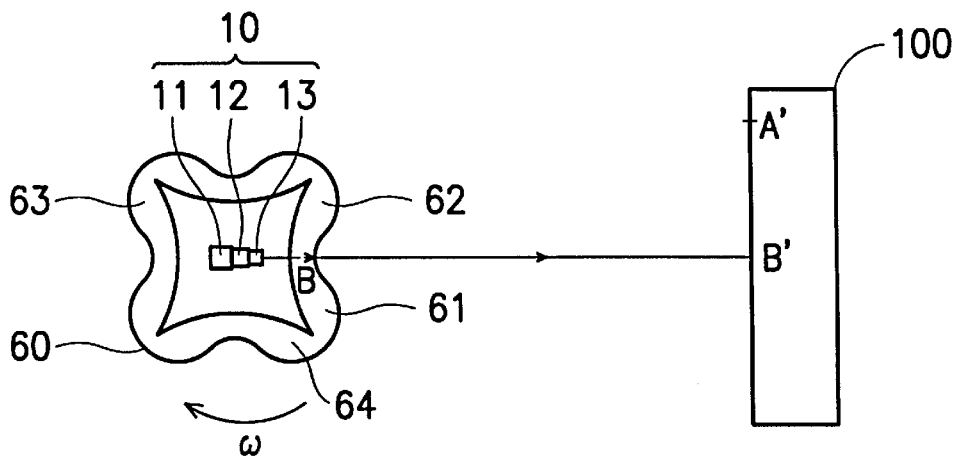
Figure 4C:
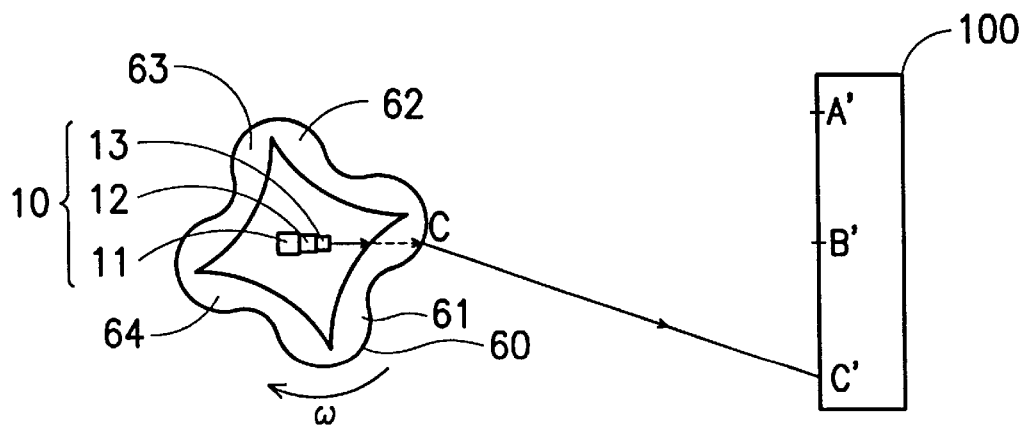

As shown in FIG. 4A, the collimated light beam is incident on a position A of a first surface 61 of the polygonal f-θ lens 60 rotating at a constant angular speed φ. The f-θ lens 61 refracts the light beam to impinge on a position A' of a scanned object 100. Next, as the polygonal f-θ lens 60 proceeds to rotate to the position shown in FIG. 4B, the collimated light beam is incident on a position B of the first surface 61 of the polygonal f-θ lens 60. The f-θ lens 61 refracts the light beam to impinge on a position B' of a scanned object 100. Next, as the polygonal f-θ lens 60 proceeds to rotate to the position shown in FIG. 4C, the collimated light beam is incident on a position B of the polygonal f-θ lens 60. The f-θ lens 61 refracts the light beam to impinge on a position C' of the scanned object 100.

Furthermore, the rotating device 20 can drive the polygonal f-θ lens 60 to rotate continuously. The light generated by the sequence A' to B' to C' results in linear scan at a constant speed. Therefore, if the collimated light beam is perpendicular to the middle of the linear scan, a polygonal f-θ lens with symmetric shape can be utilized.

Figure 5A:
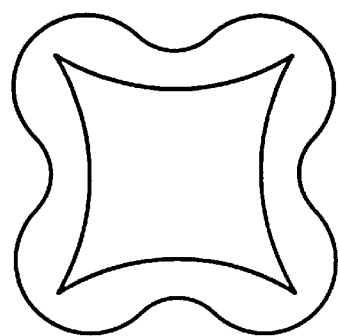
FIGS. 5A to 5C schematically show geometric diagrams of the polygonal f-θ lenses of the invention.
Figure 5B:
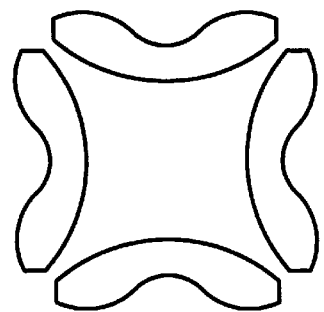
Figure 5C:
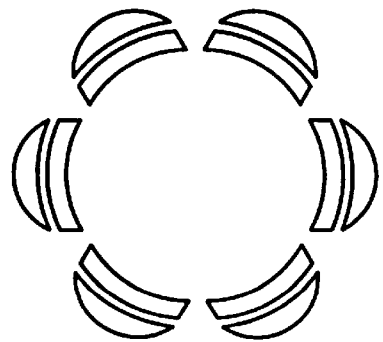

As shown in FIG. 5A to 5C, the f-θ lenses can be combined into a single lens or can be disposed discretely. In either case, the lenses take the shape of a polygon, wherein each f-θ lens consists of one lens or a lens set, such as a doublet lens.

Figure 6A:
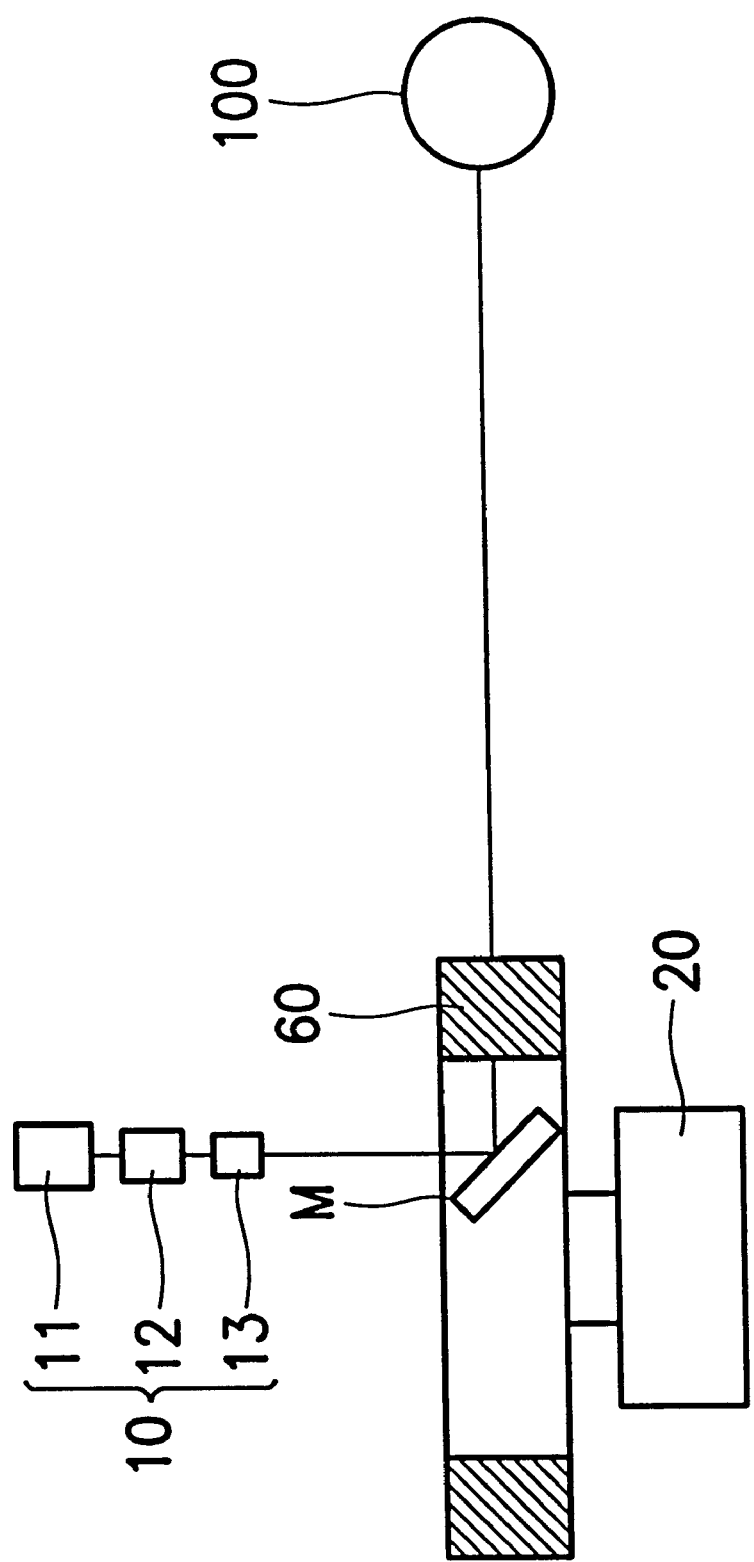
FIGS. 6A and 6B respectively show the structures of the optical path of the light source.
Figure 6B:
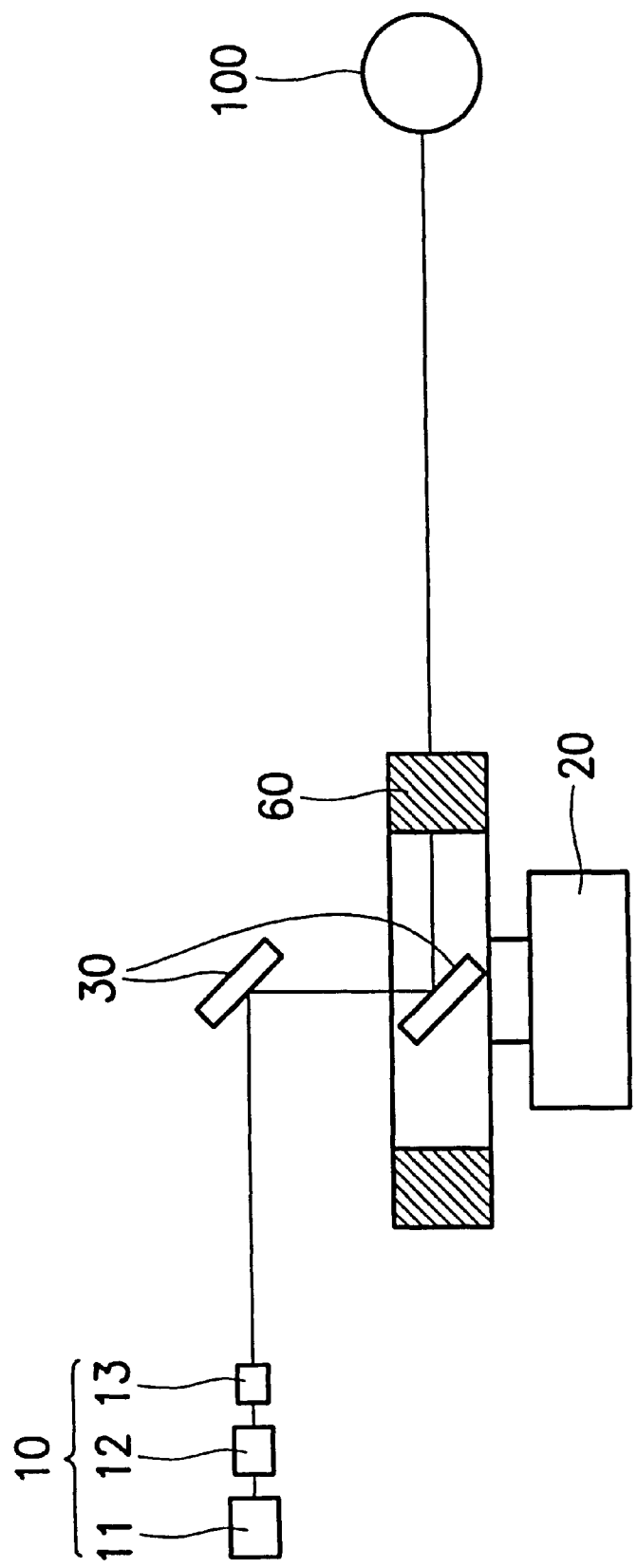

Moreover, as shown in FIG. 6A and 6B, the light source 10 emitting collimated light beam can be located outside of the polygonal f-θ lens 60. The collimated light beam can be guided to impinge on the polygonal f-θ lens 60 by a mirror M or a set of mirrors 30, wherein the polygonal f-θ lens 60 refracts the collimated light beam to produce a linear scan at a constant speed.

Figure 7A:
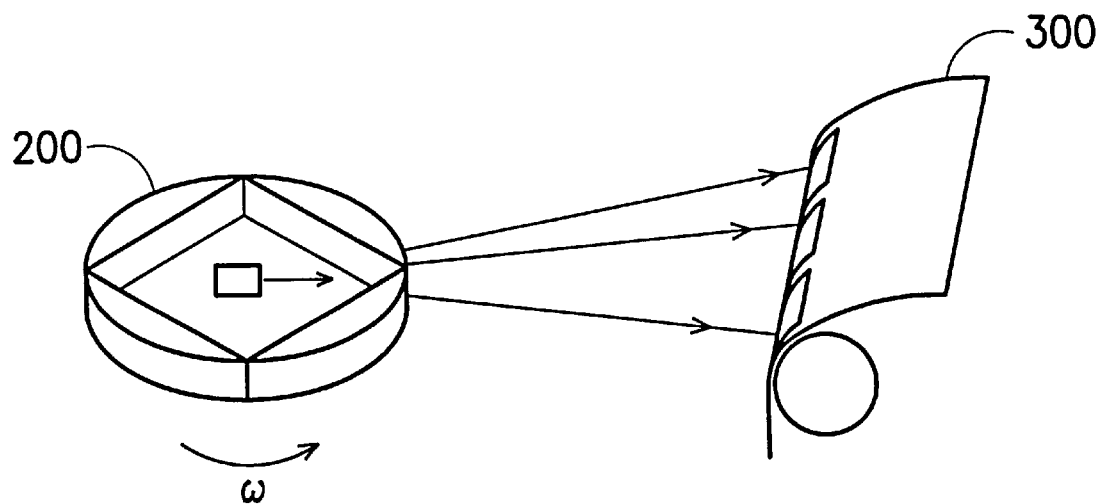
FIGS. 7A and 7B respectively show the applications of an optical scanning apparatus of the invention.
Figure 7B:
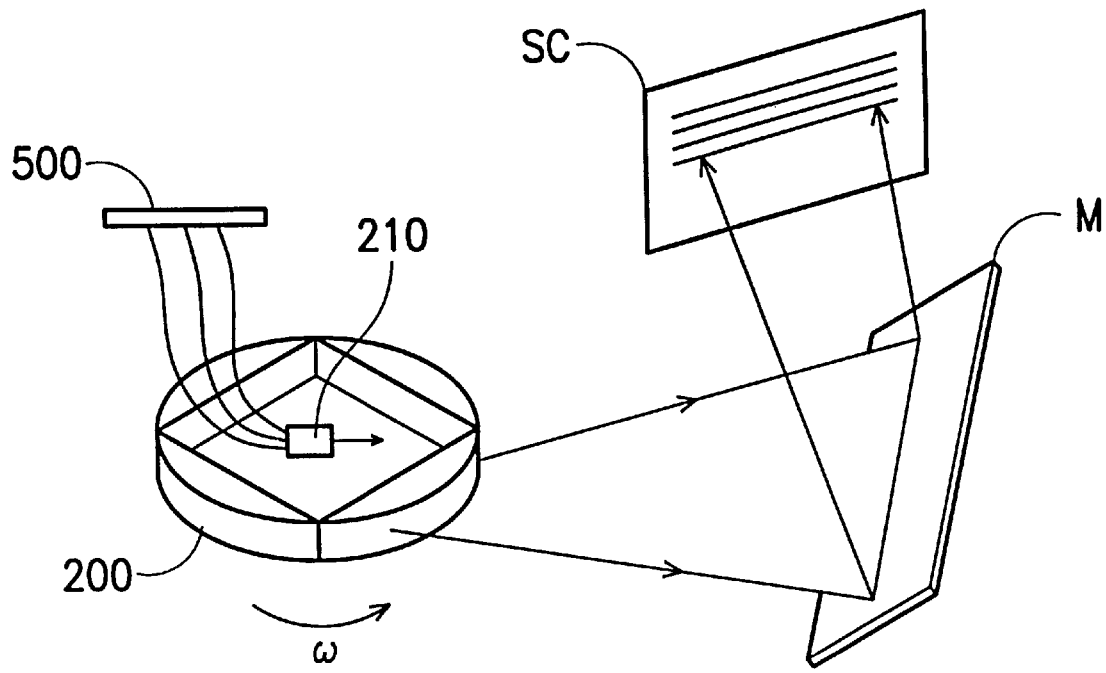

FIG. 7A shows an optical printer applying an optical scanning apparatus of the invention. The optical scanning apparatus 200 produces a linear scan on a recording medium 300, such as a photosensitive film or a photoconductor, such that the image is directly recorded onto a recording medium 300. FIG. 7B shows a display applying an optical scanning apparatus of the invention. A driving display 500 is connected to a light source 210 that emits a collimated light beam of predetermined colour to a polygonal f-θ lens 200. Next, rotating the polygonal f-θ lens 200 refracts the collimated light beam to produce a linear scan when the linear scan is reflected onto a screen SC by a mirror M. Moreover, rotating the mirror M forms a two-dimensional image due to the temporary retention of light stimuli by the human eye during vision.

In the invention, all the embodiments use at least one rotary f-θ lens, wherein the rotary f-θ lens refracts the incoming collimated light beam to form a linear scan. Applying the refraction theory, if the light source has an angle error, the linear scan of the embodiments won't increase the angle error. Further, the invention prevents small angle error from increasing. Moreover, the invention eliminates the use of the rotary polygonal mirror, thereby allowing for a more compact optical scanning apparatus and lower production cost.

While the preferred embodiment of the present invention has been described, it is to be understood that modifications will be apparent to those skilled in the art without departing from the spirit of the invention. The scope of the invention, therefore, is to be determined solely by the following claims.

What is claimed is:

1. An optical scanning apparatus for producing a linear scan, comprising:
    a light source emitting a collimated light beam;
    an f-θ lens refracting the collimated light beam into a predetermined position of the linear scan; and
    a rotary device driving the f-θ lens to rotate continuously to produce the linear scan.

2. An optical scanning apparatus as claimed in claim 1, wherein the rotary device drives the f-θ lens to rotate at a constant angular speed, and then the f-θ lens refracts the collimated light beam to form the linear scan at a constant speed.

3. An optical scanning apparatus as claimed in claim 1, wherein the light source comprises a semiconductor laser, a collimated lens and a cylindrical lens.

4. An optical scanning apparatus as claimed in claim 1, further comprising a mirror reflecting the collimated light beam to the f-θ lens.

5. An optical scanning apparatus for producing a linear scan, comprising:
    a light source emitting a collimated light beam;
    a polygonal f-θ lens refracting the collimated light beam into a predetermined position of the linear scan; and
    a rotary device driving the polygonal f-θ lens to rotate continuously to produce the linear scan.

6. An optical scanning apparatus as claimed in claim 5, wherein the rotary device drives the polygonal f-θ lens to rotate at a constant angular speed, and then the polygonal f-θ lens refracts the collimated light beam to form the linear scan at a constant speed.

7. An optical scanning apparatus as claimed in claim 5, wherein the light source comprises a semiconductor laser, a collimated lens and a cylindrical lens.

8. An optical scanning apparatus as claimed in claim 5, further comprising a mirror reflecting the collimated light beam to the polygonal f-θ lens.

9. An optical scanning apparatus as claimed in claim 5, wherein the polygonal f-θ lens comprises a plurality of f-θ lenses combined with each other to form a polygonal f-θ lens.

10. An optical scanning apparatus as claimed in claim 5, wherein the polygonal f-θ lens comprises a plurality of discrete f-θ lenses disposed form a polygonal f-θ lens.

11. An optical scanning apparatus as claimed in claim 9, wherein each f-θ lens has a symmetric shape.

12. An optical scanning apparatus as claimed in claim 10, wherein each f-θ lens has a symmetric shape.

* * * * *